United States Patent [19]

Lagakos et al.

[11] Patent Number: 4,530,078
[45] Date of Patent: Jul. 16, 1985

[54] MICROBENDING FIBER OPTIC ACOUSTIC SENSOR

[76] Inventors: Nicholas Lagakos, 12012 Remington Dr., Silver Spring, Md. 23902; W. James Trott, 7053 Wardell St., Annandale, Va. 22003

[21] Appl. No.: 387,633

[22] Filed: Jun. 11, 1982

[51] Int. Cl.³ .................. H04R 17/00; G02B 5/14
[52] U.S. Cl. .................. 367/149; 367/172; 367/912; 73/855; 350/96.29
[58] Field of Search ............. 367/149, 151, 912, 140, 367/166, 176, 172, 140; 181/110; 73/655, 657

[56] References Cited

U.S. PATENT DOCUMENTS

| | | | |
|---|---|---|---|
| 4,193,130 | 3/1980 | Young et al. | 367/149 |
| 4,296,486 | 10/1981 | Vasile | 367/140 |
| 4,313,185 | 1/1982 | Chovan | 367/149 |
| 4,342,907 | 8/1982 | Macebo et al. | 367/140 |
| 4,390,976 | 6/1983 | Eynck | 367/149 |
| 4,449,210 | 5/1984 | Myer | 367/149 |

OTHER PUBLICATIONS

Lagakos, Macedo, Litovitz, Mohr, Meister "Fiber Optic Displacement Sensor"; Advances in Ceramics; vol. 2, Ed. by Bendow & Mitra; American Cer. Soc. 1981; pp. 539-544.
Fields, Aswa, Smith, Morrison "Fiber-Optic Hydrophone" Advances in Ceramics; vol. 2, Ed. by Bendow and Mitra; American Cer. Soc. 1981; pp. 529-538.
Fields and Cole; "Fiber Microbend Acoustic Sensor"; Applied Optics; vol. 19; No. 19; Oct. 1980; pp. 3265-3267.
Bucaro and Cole "Acousto-Optic Sensor Development"; Oct. Eascon 1979 Record; pp. 572-580.
Jackson, Intensity Modulated Optical Hydrophone, General Electric 1980 IEEE pp. 42-46.
Bucaro & Cole Acoustic Optic Sensor Naval Research, Washington, D.C. pp. 572-580.

Primary Examiner—Nelson Moskowitz
Assistant Examiner—Brian S. Steinberger
Attorney, Agent, or Firm—Robert F. Beers; William T. Ellis; John L. Forrest

[57] ABSTRACT

A microbending fiber optic acoustic sensor. A point hydrophone according to a first preferred embodiment of the present invention includes two opposed pistons which are subjected to an acoustic pressure wave. In response to the pressure wave, the opposed pistons push a pair of deformer plates against an optical fiber to deform the fiber thereby intensity modulating an optical signal passing through the fiber. An extended hydrophone according to a second preferred embodiment of the present invention includes an optical fiber wound in a helical groove formed in a cylindrical surface. A plurality of parallel axial slots are located in a spaced-apart relationship to each other at positions about the cylindrical surface and are oriented in parallel with the axis of the cylindrical surface. Each axial slot intersects with the helical groove at a plurality of locations and has a depth greater than the depth of the groove. An applied acoustic pressure wave forces the fiber into the axial slots thus deforming the fiber and thereby intensity modulating an optical signal passing through the fiber in response to the acoustic pressure. Depth equalization means are included for each embodiment.

25 Claims, 16 Drawing Figures

MICROBENDING FIBER OPTIC ACOUSTIC SENSOR

BACKGROUND OF THE INVENTION

The present Invention relates, in general, to novel acoustic sensors and, more particularly, to novel acoustic sensors which include transducers based upon the phenomenon of the microbending of optical fibers.

At the present time, commonly used physical sensors are mainly based upon piezoelectric or magnetostrictive devices. These sensors are all electrically wired systems and, as such, are subject to electromagnetic interference and are difficult to secure.

With the rapid advancement of fiber optic technology (fibers, lasers, detectors, etc.) numerous optical fiber sensors have been developed. For example, phase modulation in single-mode fibers has been utilized as a transduction mechanism for fiber optic sensors such as acoustic, gyro, magnetic, acceleration, and temperature sensors, to name but a few. These sensors are somewhat complex and they utilize single mode fiber technology, some areas of which have yet to be perfected.

In addition to phase modulation, intensity modulation can also be utilized for fiber optic sensing. Intensity modulated sensors include evanescent wave sensors, coupled waveguide sensors, moving fiber optic sensors, Schlieren or grading sensors, polarization sensors, and Fresnel reflection sensors. Most of the known intensity modulated sensors are of a fiber termination type wherein the sensing fiber is terminated in the sensing area with the light leaving the fiber and subsequently being coupled into a second fiber. Such systems have problems efficiently coupling the light into the second fiber, especially in hostile or remote sensing environments.

A very promising transduction mechanism for fiber optic sensors is intensity modulation produced by mode coupling due to microbending along the axis of a multimode fiber. Such sensors are based on intensity modulation of the light power in the core or clad modes produced by a periodic axial deformation of the fiber which introduces strong excess losses due to the coupling of core (guided) modes to radiated modes. Such sensors have been described in the literature by Fields, Asawa, Smith, and Morrison, "Fiber-Optic Hydrophone" *Advances in Ceramics*, Vol. 2, ED. by B. Bendow and S. Mitra, Publ. Amer. Cer. Soc. 1981, Proc. 82nd Annual Meeting, Amer. Cer. Soc., Chicago, April 1980, p. 529-538; and Lagakos, Macedo, Litovitz, Mohr, and Meister, "Fiber Optic Dispacement Sensor", IBID. p. 539-544. These articles can supply the reader with additional background information regarding microbend sensors and as such are specifically incorporated herein by reference.

In a typical prior art microbending sensor, periodic deformation along the fiber axis can be introduced by means of a pair of corregated plates, called the deformer, which are located on either side of a multimode fiber and which apply pressure thereto. Generally the corregations of the deformer plates would interleave if the optical fiber were removed from between them.

Figure 1:
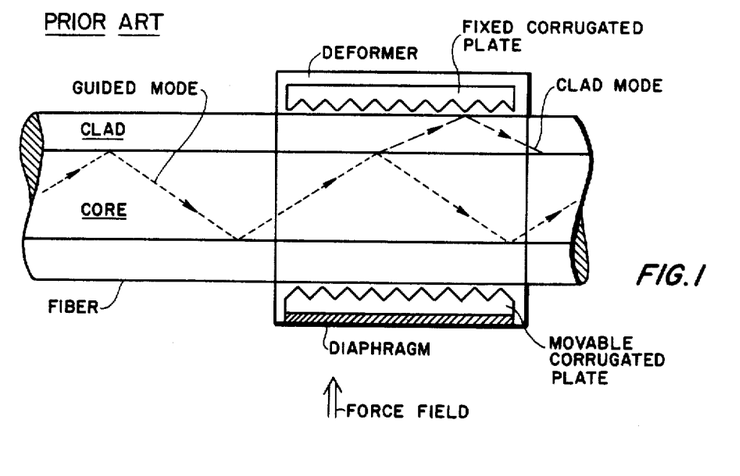
FIG. 1 illustrates the principles of microbending fiber optic devices.

FIG. 1 schematically illustrates such a prior art microbending sensor arrangement and illustrates the effect on light conducted by a fiber due to force from a pressure field applied to a diaphragm and transferred to act on the fiber by means of the deformer. Any relative displacement of the corregated plates of the deformer introduced by an external field, such as an acoustic field, will cause a periodic deformation of the fiber which will result in mode coupling. This mode coupling redistributes the light among core modes and couples some light from the core modes to clad modes. Thus, by monitoring the light power in certain modes, an external force may be detected. These monitored modes may be core modes or clad modes.

Figures 2, 2A:
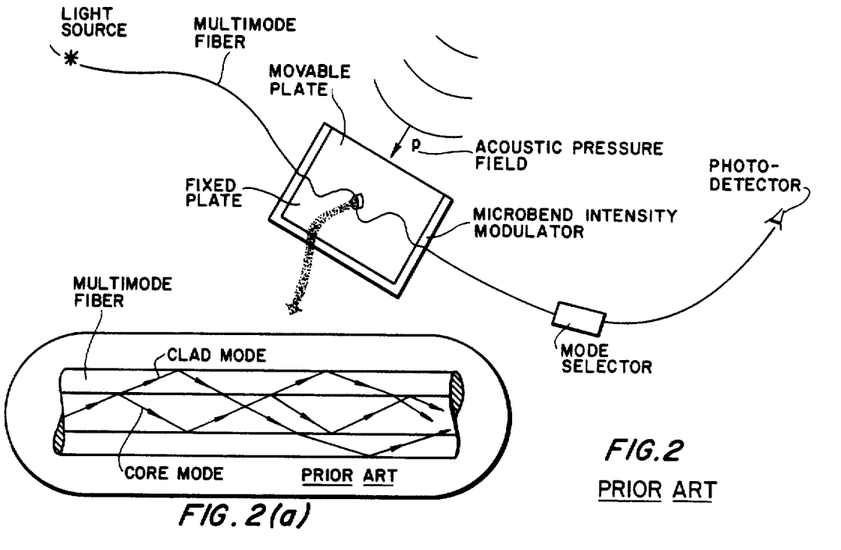
FIG. 2 illustrates a prior art microbending fiber optic acoustic sensor.
FIG. 2(a) illustrates a detail of the prior art sensor of FIG. 2.

FIG. 2 illustrates a prior art acoustic pressure sensor including an intensity-modulated microbend fiber optic sensing element. In this sensor, light from a source, such as a laser or a light emitting diode, is coupled into a multimode fiber and propagates through an acoustically sensitive microbend intensity modulator which surrounds the fiber. FIG. 2(a) illustrates various light ray patterns propagating within a portion of the multimode fiber passing through the microbend intensity modulator.

The characteristics of a microbend sensor, such as, sensitivity, minimum detectable pressure, and resonant frequency, depend strongly upon the acoustical and mechanical design of the sensor and, in particular, depend on the characteristics of the acoustic coupler and the deformer. The acoustic coupler is usually a piston or a diaphragm which multiplies and transfers the pressure of an applied acoustic wave to the sensing element. The design of the deformer which bends the sensing element can vary widely, being periodic or non-periodic, spatically short or extended, in accordance with the desired sensor performance. For compactness and versatility the deformer can even be an integral part of the fiber coating.

After leaving the modulator, the fiber passes through a mode selector which selects the group of modes to be detected by a photodetector such as a pin diode or an avalanche diode. The selected modes for detection may be all the core modes, all the clad modes, either high or low order core modes, or any combination of these groups of modes. Thus, by monitoring the light power in certain modes, an external force can be detected.

The known prior art acoustic sensors, as schematically illustrated in FIG. 2 all suffer from numerous undesirable characteristics. In particular, the mechanical design tends to be rather complex, the alignment of the deformer is critical, the sensor bandwidth is limited, and the sensor performance is often degraded due to acceleration effects within the deformer.

SUMMARY OF THE INVENTION

Accordingly, one object of the present Invention is to provide novel acoustic sensor which do not exhibit the numerous well-known disadvantages of piezoelectric or magnetostrictive devices.

Another object is to provide novel acoustical sensors which utilize fiber optic technology.

Still another object is to provide novel acoustical sensors which utilize intensity modulated fiber optic technology and thus do not exhibit the well-known complexities and other disadvantages of single-mode fiber optic systems.

Yet another object is to provide novel microbending fiber optic acoustic sensors which are all optical except for the light source and light detection devices and thus exhibit low power consumption and a high tolerance to environmental conditions.

Another object is to provide novel acoustic sensors which are not sensitive to electromagnetic interference, which provide high transmission security, which are highly stable, and which are low in overall cost.

Yet another object is to provide novel acoustic sensors which are mechanically simple and which do not exhibit well-know mechanical problems such as errors due to the effects of acceleration.

These and numerous other objects and advantages of the present Invention will become clear by reference to the detailed description of the present Invention and by reference to the numerous drawings contained herein.

These and other objectives and advantages are provided by a novel acoustic sensor according to a preferred embodiment of the present Invention which includes an optical fiber through which optical energy is conducted. First and second microbending deformer means are positioned in contact with the fiber at locations diametrically opposed to each other. First and second acoustic coupling means are included for coupling applied acoustic waves to the deformer means which deform the fiber and thereby intensity modulate the optical energy conducted by the fiber in response to the applied pressure waves.

These and other objectives and advantages are provided by a novel acoustic sensor according to another preferred embodiment of the present Invention which includes an optical fiber wraped about a cylindrical surface and located in a helical groove formed therein. A plurality of spaced-apart parallel slots are formed in the cylindrical surface and are positioned in parallel with the axis of the cylinder. Each of the slots intersects the helical groove at several locations and has a depth which is greater than the depth of the helical groove. Means are included for deforming the fiber by forcing the fiber into the slots in response to applied acoustic pressure waves, thereby intensity modulating optical energy conducted by the fiber in response to the applied pressure.

BRIEF DESCRIPTION OF THE DRAWINGS

A more complete appreciation of the present Invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
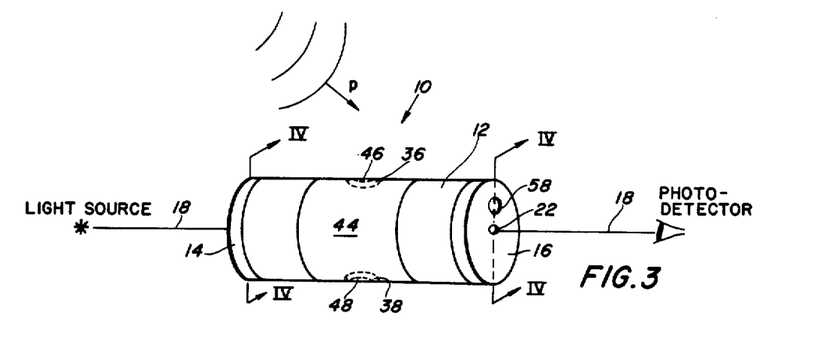
FIG. 3 illustrates a microbending fiber optic point hydrophone according to a first perfferred embodiment of the present Invention.
Figures 4, 5, 6:
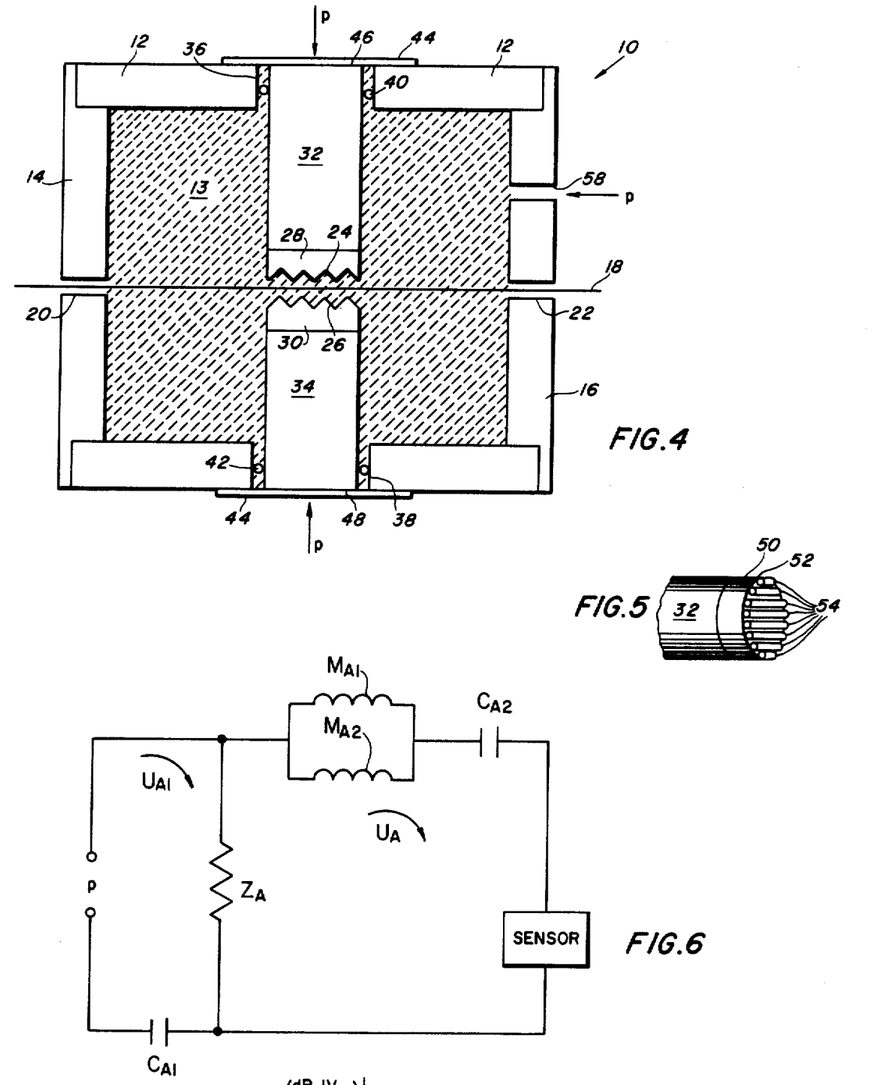
FIG. 4 is a cross section of the point hydrophone of the present Invention taken along plane IV—IV as shown in FIG. 3.
FIG. 5 illustrates a preferred embodiment of a deformer of the point hydrophone shown in FIG. 3.
FIG. 6 is an equivalent circuit of the point hydrophone shown in FIG. 3 according to the present Invention.

Referring now to the drawings, wherein like reference numerals designate identical or corresponding parts throughout the several views, and more particularly to FIG. 3 thereof, a point hydrophone 10 is illustrated according to a first preferred embodiment of the present Invention. FIG. 4 is a cross sectional view of the point hydrophone 10 of FIG. 3 taken along plane IV—IV. The point hydrophone 10 includes a cylindrical housing 12 made of acoustically stiff material having first and second end caps 14 and 16 rigidly attached thereto by means (not shown) of threads, set screws, cement or any other appropriate means as should be apparent to those skilled in the art. The cylindrical housing 12 is filled with a liquid 13 which will be discussed further below.

An optical fiber 18 passes through the axis of the point hydrophone 10 via openings 20 and 22 positioned at the centers of each end cap 14 and 16, respectively. The fiber 18 is sealed in the openings 20 and 22 in a liquid-tight manner by means of silicone rubber sealant or other equivalant means. The fiber 18 may be any type of single or multimode fiber.

The fiber 18 is sandwiched between two corregated surfaces 24 and 26 of two respective deformer plates 28 and 30. The corregated surfaces are oriented such that the corregations are perpendicular to the axis of the fiber 18. The corregated surfaces would mesh together in the absence of the fiber 18. The deformer plates and their corregated surfaces will be further discussed below.

The deformer plates 28 and 30 are rigidly attached to a pair of equal mass diametrically opposed cylindrical pistons 32 and 34, respectively. The pistons 32 and 34 pass, respectively, through diametrically postioned circular openings 36 and 38 in the cylindrical housing 12 and are movably sealed thereto by means of resilient "o-rings" 40 and 42 or other equivalant sealing means. The pistons 32 and 34 are retained within the cylindrical housing 12 by means of a resiliant sleeve 44 which surrounds at least the portion of the housing 12 encompassing the circular openings 36 and 38. In addition to retaining the pistons within the housing, the sleeve 44 acts to bias the pistons toward the fiber 18 and thus to maintain the corregated surfaces 24 and 26 of the deformer plates 28 and 30 in contact with the fiber. The end surfaces 46 and 48 of the pistons 32 and 34, respectively, are exposed to an acoustic pressure field P through the resilient sleeve 44 which pushes the pistons toward the fiber 18 in proportion to the amplitude and in phase with the pressure field P. The use of the two diametrically opposed equal mass pistons for activating the deformer plates and their respective corregated surfaces reduces the sensitivity of the hydrophone to the effects of acceleration as compared to prior art devices. It should be noted that in some applications, the resilient sleeve may be unnecessary.

FIG. 5 illustrates a preferred embodiment of a deformer plate and its associated corregated surface. The deformer plate is formed from a permanant magnet 50 with one pole permanently affixed to the end of a piston, such as piston 32, by any well-known means. The other pole of the magnet 50 remains exposed as a planar surface 52. A plurality of small spaced-apart parallel wires 54 are attached to the surface 52 to form a grating. This grating forms the corregated surface of the piston 32. The wires 54 may be individually bonded to the surface 52 as illustrated, in any well-known manner, or they may be attached to a frame member (not illustrated) which is then in turn attached to the surface 52. The piston 32 is positioned in the hydrophone 10 such that the wires 54 are oriented perpendicular to the axis of the fiber 18.

A similar magnetic deformer plate and associated corregated surface (parallel wires) is affixed to the opposite piston 34 and is also positioned such that its grating wires are perpendicular to the fiber 18. However, in this deformer the polarity of the permanant magnet is reversed from that of the magnet 50 attached to piston 32 such that its exposed surface 56 (not illustrated) is of the opposite magnetic polarity to that of the exposed surface 50 attached to piston 32. When assembled adjacent the fiber 18 within the housing 12, the magnetic surfaces 50 and 56 attract each other so as to bias the grating wires (corregated surface) of each piston toward the fiber to provide a slight positive pressure against the fiber thereby enhancing the coupling of the sound pressure to be detected to the light modulating action.

It should be apparent to the skilled reader that many alternative deformer structures could be utilized. For example, the corregated surface could be directly machined in the ends of the pistons.

The point hydrophone 10 further includes a small port or opening 58 which acts as a low pass filter to equalize the hydrostatic pressure in the liquid 13 due to the effects of depth and slowly varying pressure changes inside and outside the hydrophone 10. The port 58 is shown as passing through the end cap 16 in FIGS. 3 and 4. Other suitable locations could be utilized as should be apparent to these skilled in the art. The length and diameter of the port 58 are parameters which must be selected for proper operation of the hydrophone as will be discussed below.

The entire point hydrophone 10 is enclosed within a liquid-impervious elastic enclosure 60 (not illustrated), such as a rubber boot or equivalant. The enclosure 60 is filled with the same liquid 13 as that which fills the hydrophone housing 12. The liquid communicates within the enclosure 60 between the interior and exterior of the hydrophone 10 via the port 58 as described above. The enclosure 60 acts to isolate the liquid medium enclosed in and surrounding the hydrophone from the medium in which acoustic pressure measurements are to be made without substantially attenuating the acoustic pressure variations. It should be noted that, under certain appropriate circumstances, the enclosure 60 may be eliminated and the hydrophone 10 may be directly immersed in the liquid medium under test as should be apparent to those of skill in the art.

The present Inventors have determined that a cylindrical housing, illustrated as housing 12 in FIGS. 3 and 4, is preferable to a rectangular container because it reduces complicating low frequency flexure modes of the case while its stiffness insures coupling to the sensor only through the pistons. The Inventors have further determined that a cylindrical housing made from steel or aluminum is sufficiently acoustically stiff if the ratio of the wall thickness of the housing to its inside radius lies between 0.1 and 0.3. Also, the end caps 14 and 16 must be made from sufficiently acoustically stiff material of a sufficient thickness such that their flexure resonance is above the operating frequency range of the hydrophone.

In order to determine the sensitivity and the minimum detectable pressure of the hydrophone 10, the mechanical compliance of the sensor $C_M$ must be determined. This can be done from the equivalent circuit of the hydrophone which is illustrated in FIG. 6. In the equivalent circuit, $C_{A1}$ is the acoustic compliance of the liquid-filled housing 12, $C_{A2}$ is the acoustic compliance of the bending optical fiber 18, $Z_A$ is the acoustic impedance of the port 58, $M_{A1}$ and $M_{A2}$ are the respective acoustic masses of the pistons 32 and 34 plus the mass of the deformers 28 and 30 and the radiation reactance, and $U_{A1}$ and $U_A$ are acoustic velocities.

The acoustic compliance $C_{A1}$ of the liquid-filled housing 12 is:

$$C_{A1} = V/\rho C^2 \qquad (1)$$

where V is the volume of the cylindrical housing 12, $\rho$ is the density of the liquid 13, and C is the speed of sound. The acoustic compliance $C_{A2}$ of the bent fiber is:

$$C_{A2} = A^2 \left[ \frac{\Lambda^3}{3E\pi d^4 m} \right] \qquad (2)$$

where A is the area of the end surfaces 46 and 48 of the pistons 32 and 34 exposed to the acoustic pressure field, $\Lambda$ is the period of the deformer corregated surface, E is the Young's modulus of the fiber, d is the outside diameter of the fiber, and n is the number of teeth on the corregated surface of one deformer plate.

The acoustic masses $M_{A1}$ and $M_{A2}$ for equal mass pistons including their deformers and radiation reactance is:

$$M_{A1} = M_{A2} = \text{piston weight}/A^2. \qquad (3)$$

In the equivalent circuit of FIG. 6, the two pistons act as acoustic reactances in parallel, and the total acoustic mass, $M_{AP}$ is:

$$M_{AP} = \frac{M_{A1} M_{A2}}{M_{A1} + M_{A2}}. \qquad (4)$$

At very low frequencies, the acoustic pressure is shorted from the sensor by the impedance $Z_A$ of the port 58, which equalizes the hydrostatic pressure due to depth across the hydrophone. The acoustic impedance of the port 58 is:

$$Z_A = \frac{l}{\pi r_1^2}\left[\frac{8\eta}{r_1^2} + \frac{4i\omega\rho}{3}\right] \quad (5)$$

where l and $r_1$ are the length and radius of the port, respectively, $\eta$ is the viscosity of the liquid 13, $\rho$ is the density of the liquid 13, and $\omega$ is the acoustic frequency. The first and second terms in Equation (5) are respectively the resistance and reactance of the port 58. The impedance $Z_A$ is predominantly resistive. The resistance of the port multiplied by the acoustic compliances $C_{A1}$ and $C_{A2}$ in parallel determines the low frequency cut-off of the circuit. The sound pressure (and sensitivity) is reduced to zero for $\omega = 0$, a steady-state pressure.

From the equivalent circuit, the displacement per unit of sound pressure x/p as a function of frequency is:

$$X/P = AC_M = \frac{i\omega C_{A1}C_{A2}Z_A/A(1 - \omega^2 M_{AP}C_{A2})}{Z_A[i\omega C_{A1} + i\omega C_{A2}/(1 - \omega^2 M_{AP}C_{A2})] + 1} \quad (6)$$

where $C_M$ is the acoustic compliance of the hydrophone. Below the resonant frequency of the hydrophone, the acoustic impedance of $C_{A2}$ is effectively reduced by the presence of the total acoustic mass $M_{AP}$ in series with it.

$C'_{A2}$ is defined as:

$$C'_{A2} = C_{A2}/(1 - \omega^2 M_{AP}C_{A2}). \quad (7)$$

By substituting in equation (5) we obtain:

$$C_M = \frac{i\omega C_{A1}C_{A2}Z_A}{A^2[Z_A i\omega(C_{A1} + C_{A2}') + 1]} \quad (8)$$

The low pass filter is represented in the denominator and produces a 6 db per octave rise below cut off when:

$$Z_A i\omega[C_{A1} + C'_{A2}] < 1. \quad (9)$$

When:

$$Z_A i\omega[C_{A1} + C'_{A2}] > 1 \quad (10)$$

we have:

$$C_M = C_{A1}C'_{A2}/A^2(C_{A1} + C'_{A2}) \quad (11)$$

and the sensitivity is frequency independent. This is the broad band frequency operational range of the hydrophone. The upper end is bound by the resonance of the hydrophone.

For high frequencies, Equation (6) becomes:

$$1/C_M = \frac{A^2[C_{A1}(1 - \omega^2 M_{AP}C_{A2}) + C_{A2}]}{C_{A1}C_{A2}} \quad (12)$$

$$= A^2\left[\frac{1}{C_{A1}} + \frac{1}{C_{A2}} - \omega^2 M_{AP}\right] \quad (13)$$

The resonance of the hydrophone $\omega_o$ occurs when Equations (12) and (13) are zero, and:

$$\omega_o^2 = 1/M_{AP}C \quad (14)$$

where:

$$C = \frac{C_{A1}C_{A2}}{C_{A1} + C_{A2}}. \quad (15)$$

At resonance:

$$Q = A\omega M_{AP}/\rho C. \quad (16)$$

The density multiplied by the speed of sound (in water divided by the area of the piston, $\rho c/A$, is the acoustic radiation resistance of the piston of acoustic mass $M_{AP}$.

Figure 7:
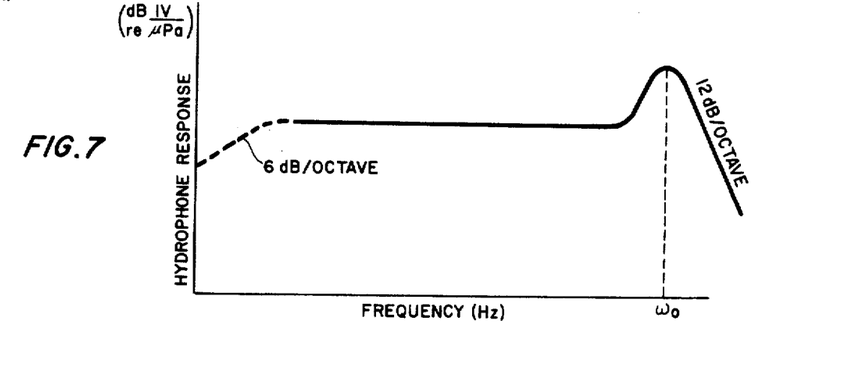
FIG. 7 illustrates the theoretical frequency response of the point hydrophone shown in FIG. 3.

FIG. 7 illustrates schematically the hydrophone sensitivity as a function of frequency. It should be noted that the sensivity rises at 6 db per octave up to the cutoff frequency of the low pass filter. At that frequency the sensitivity is −6 db with respect to the broad band frequency independent sensitivity condition of Equation (10). At the upper end of this broad band region, the sensitivity drops slightly due to diffraction effects. The sensitivity then rises to the resonant frequency level at which Q will probably not exceed 4.

In view of Equations (12) and (13), high sensitivity requires large values of the compliances $C_{A1}$ and $C_{A2}$. In view of Equation (14), a broad band sensitivity requires small values of $C_{A1}$ and $C_{A2}$. This is a common trade-off in the design of transducers. A small transducer generally means smaller values of $C_{A1}$ and $C_{A2}$ and, consequently, lower sensitivity and wider bandwidth than a larger transducer. In a small transducer, $C_{A1}$ can be increased by reducing the bulk modulus, $\rho C^2$, of the liquid 13. This can be achieved by means such as by packing part of the volume of the transducer with glass microballoons.

The fiber used to test the point hydrophone of the present Invention was a Hughes Research Laboratory step index, aluminum coated, multimode fiber with a 0.133 numerical aperature, which is fairly sensitive to microbinding losses. The fiber consisted of a 60 μm outside diameter core of 95% $SiO_2$ - 4% $GeO_2$ - 1% $P_2O_5$, a 125 μm outside diameter cladding of 95% $SiO_2$ - 5% $B_2O_3$, and a 165 μm outside diameter aluminum coating.

The hydrophone was immersed in a standard acoustic calibrator (G40 type) which produced a sinusoidally varying pressure field. A calibrated hydrophone (F61 type) was inserted at the level of the point hydrophone and was used to measure the acoustic pressure levels. Light emitted from a single mode, 100 TROPEL laser at 0.6328 μm was coupled into the fiber using a 20X microscope objective. Mode stripping was accomplished by removing the aluminum coating from a 5 cm section of the fiber and painting that section with an oil base black paint. The intensity modulated core modes were detected by an RCA C-30809 photodetector whose output was monitored with a spectrum analyzer.

A test model of the point hydrophone 10 according to the present Invention had the following specifications. These specifications, of course, should not be considered as limiting the present Invention.

Outside Housing Diameter = 2.54 cm
Inside Housing Diameter = 2.06 cm
Outside Housing Length = 12.7 cm
Inside Housing Length = 10.2 cm
Housing Material = Stainless Steel Liquid = Water
Volume of Liquid = $3.34 \times 10^{-5}$ m$^3$
Port Length = 1 cm
Port Radius r$_1$ = $4.68 \times 10^{-3}$ cm
Piston Length = 0.6 cm
Piston Area = $2.8 \times 10^{-5}$ m$^2$
Piston Material = Magnesium
Deformer mechanical periodicity $\Lambda$ = 2.5 mm
Deformer Number of teeth n = 6

Figure 8:
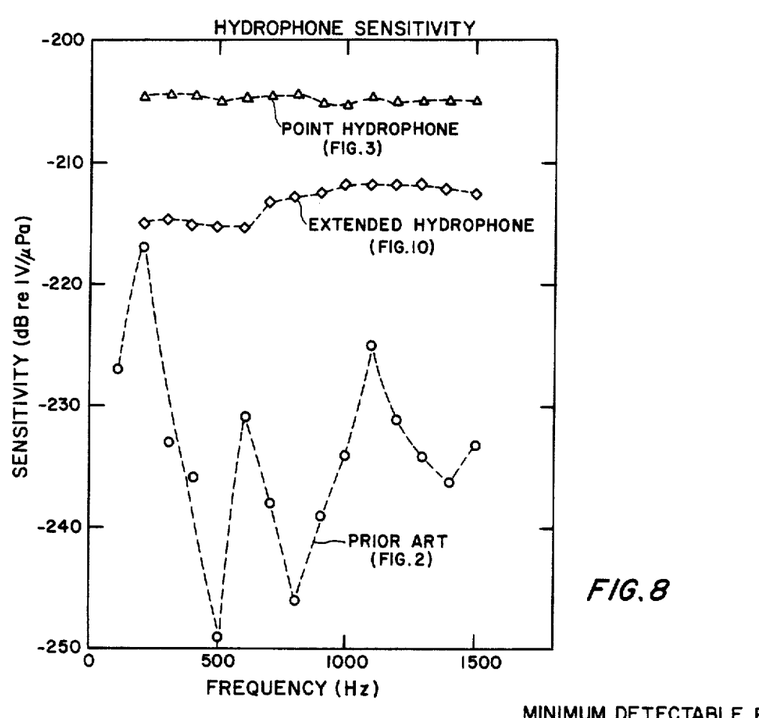
FIG. 8 illustrates sensitivity curves as a function of frequency comparing the microbending hydrophones of the present Invention to the prior art hydrophone shown in FIG. 2.

FIG. 8 illustrates the measured frequency response of the point hydrophone sensitivity (triangles) from 200 H$_z$ to 1500 H$_z$. As can be seen from this figure, the sensitivity is approximately $-205$ db re 1 v/$\mu$Pa and is flat to within $\pm 0.5$ db. By comparison, FIG. 8 also ilustrates the frequency response of the sensitivity of a prior art microbend sensor (circles) similar to that shown in FIG. 2, measured under similar condition as described by Fields and Cole, "Fiber Microbend Acoustic Sensor", Applied Optics Vol. 19, No. 19, 1980. The point hydrophone of the present Invention clearly demonstrates a significant improvement over the prior art.

Figure 9:
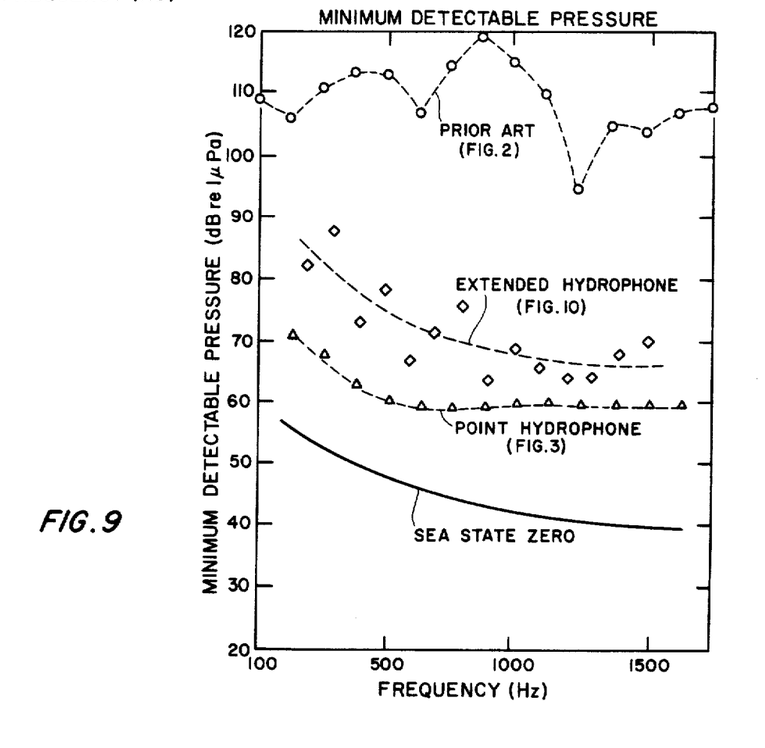
FIG. 9 illustrates the minimum detectable pressure as a function of frequency comparing the microbending hydrophone of the present Invention with the prior art hydrophone shown in FIG. 2.

FIG. 9 illustrates the measured minimum detectable pressure of the point hydrophone (triangles) and that of the prior art sensor of FIG. 2 (circles) from 200 Hz to 1500 Hz. The solid line represents Sea State zero. As can be seen from this figure, for frequencies higher than 500 Hz, the minimum detectable pressure is 15 db higher than the Sea State zero at 60 db re 1 $\mu$Pa,, which is much lower than that of the prior art sensor. At frequencies lower than 500 Hz, the electronic noise of the laser significantly deteriorates the sensor minimum detectable pressure.

Figure 10:
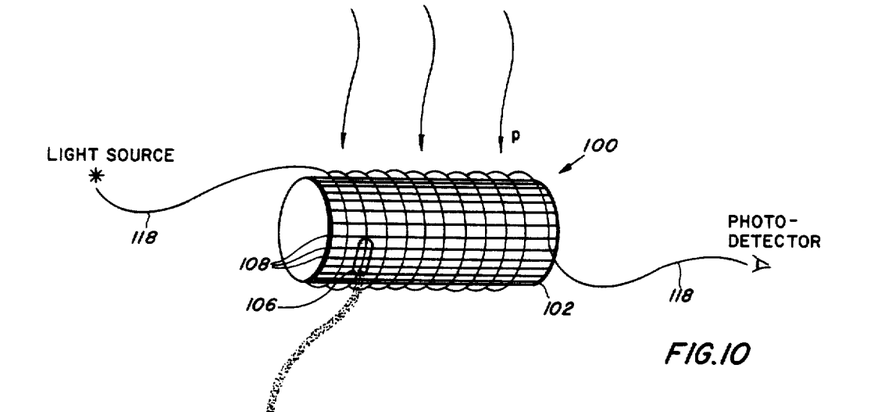
FIG. 10 illustrates an microbending fiber optic extended hydrophone according to a preferred embodiment of the present Invention.
Figure 10A:
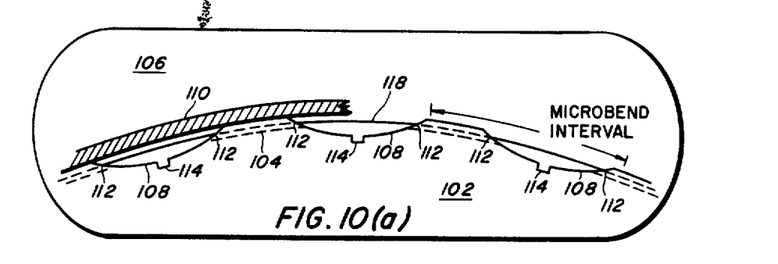
FIG. 10(a) illustrates a detail of the extended hydrophone shown in FIG. 10.

FIG. 10 illustrates an extended hydrophone 100 according to a second preferred embodiment of the present Invention. In the extended hydrophone 100 a long optical fiber 118 is wrapped about a hollow acoustically stiff cylindrical housing 102 in a helical groove 104 (not shown in FIG. 10) circumferentially machined in the cylindrical outer surface of the cylindrical housing 102 as shown in FIG. 10(a) which illustrates a partial section about the circumference of the housing 102 in the area 106 shown in FIG. 10. A plurality of axial slots 108 are located in the cylindrical outer surface of the housing 102 in parallel with the axis of the housing. Each axial slot 108 is cut below the root of the groove 104 such that portions of the fiber 118 are periodically exposed as shown in FIG. 10(a). The shape of the axial slots will be discussed further below.

A resilient sleeve 110 encloses at least part of the housing 102 and covers at least the portion of the housing 102 which is wrapped with the fiber 118 as shown in FIG. 10(a). The resilient sleeve 110 contacts the portions of the fiber 118 which are periodically exposed by the plurality of axial slots 108 and thus is the acoustic coupler through which acoustic pressure is applied to the fiber. The portions of the fiber 118 within the groove regions between the axial slots 108 are not in contact with the sleeve 110 and thus are not exposed to the acoustic field. The resilient sleeve may be made from rubber or other appropriate resilient material.

Figure 11:
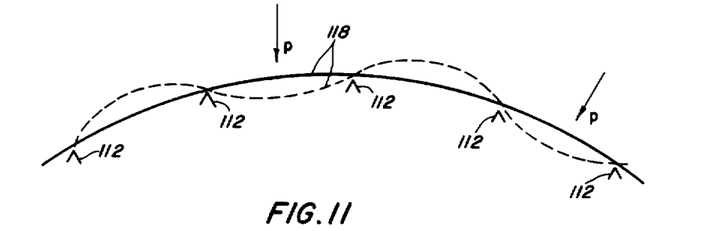
FIG. 11 schematically illustrates the operation of the extended hydrophone shown in FIG. 10.

FIG. 11 schematically illustrates the effects of acoustic pressure on a portion of the fiber 118. Reference numeral 112 designates the intersections between the thread 104 and the axial slots 108 in FIG. 10(a). The intersections 112 are schematically represented in FIG. 11. Prior to the application of acoustic pressure, the fiber 118 lies in a relatively smooth curve due to its helical wrapping in the helical groove 104 about the housing 102. The acoustic pressure P is applied through the resilient sleeve 110 to the exposed portions of the fiber 118 passing through the axial slots 108. These portions of the fiber are deflected inwards due to the pressure while the portion of the fiber which are isolated from the acoustic field by the groove 104 are deflected in the opposite (outward) direction by a force moment at the periodic supports formed by the intersections 112 of the axial slots and the groove. The broken line in FIG. 11 illustrates the shape of the fiber 118 due to the application of pressure P.

In a preferred embodiment of the extended hydrophone, the axial slots 108 are equally spaced about the circumference of the housing 102. In this situation, the pressure P causes the fiber to take on a sinusoidal shape.

In a preferred embodiment, the axial slots 108 each have a shallow curved contour as shown in FIG. 10(a) which aids in the formation of the sinusoidal shape of the fiber 118 upon application of pressure. Additionally, in the preferred embodiment, each curved axial slot includes a deeper cut portion 114 in its surface which aids fluid communication within the slots. Other appropriate contours may be used for the axial slots as should be apparent to the skilled reader.

Figure 12:
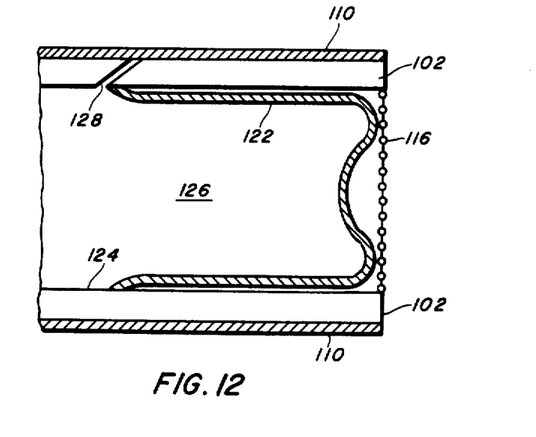
FIG. 12 illustrates a preferred embodiment for the pressure equilization of the extended hydrophone shown in FIG. 10.

For operation at depth the response of the extended hydrophone 100 to static pressure must be eliminated. FIG. 12 is a partial longitudinal cross section of the hydrophone 100. One end of the housing 102 is covered by an acoustically stiff end cap 116 (not illustrated) similar to the end caps 14 and 16 of the point hydrophone 10 shown in FIG. 3. The other end of the housing is enclosed by an open grill 120 or screen which prevents debris from entering the housing while allowing fluid to enter freely. Within the housing, a rubber diaphragm 122 is sealably attached to the cylindrical inner wall 124 of the housing 102.

The interior cavity 126 of the housing defined by the inner wall 124, the end cap 116, and the diaphragm 122 acts like an accumulator and is filled with air. Pressure variations occurring outside the hydrophone are transmitted through the diaphragm 122 to produce corresponding pressure variations in the air in the cavity 126.

A capillary tube 128 runs through the wall of the housing joining the interior cavity 126 with one of the axial slots 108 to couple air pressure within the cavity 126 to the void areas which surround the fiber 118 between the inside of the resilient sleeve 110 and the outer surface of the housing 102. The capillary tube 128 acts as a low pass filter to equalize the pressure appearing across the resilient sleeve 110 due to the effects of depth and other slowly changing pressure variations. The length and diameter of the capillary tube are parameters which must be selected for proper operation of the hydrophone. The equations for calculating these parameters are the same as those given above with respect to the port 58 of the point hydrophone 10 shown in FIG. 3.

Figure 13:
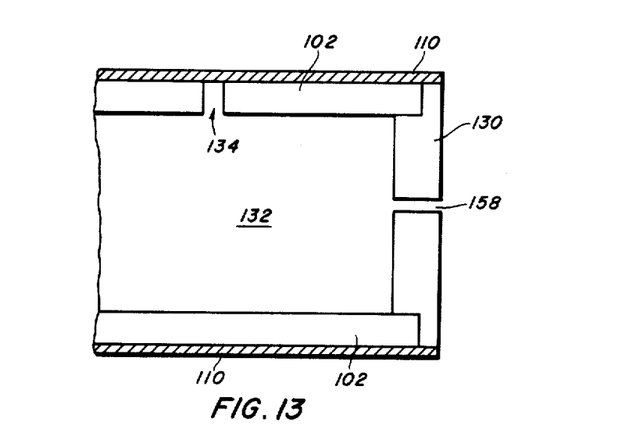
FIG. 13 illustrates another preferred embodiment for the pressure equilization of the extended hydrophone shown in FIG. 10.

For operation at extreme depths, alternative equalization means must be utilized. In this case, one end of the housing 102 is enclosed by the end cap 116 as described above. FIG. 13 illustrates the other end of the housing 102 which is also enclosed by an acoustically stiff end cap 120, similar to the end cap 116. The interior cavity 132 of the housing 102 is filled with the same liquid which surrounds the hydrophone 100. A fluid passageway 134 passes through the wall of the housing 102 joining the interior cavity 132 with at least one of the axial slots 108 to couple fluid pressure within the cavity 132 to void areas which surround the fiber 118 between the inside of the resilient sleeve 110 and the outer surface of the housing 102. The fluid passageway 34 is preferably as short as possible and as wide as possible so as to allow the free flow of liquid therethrough which improves the static pressure equalization of the hydrophone. The extreme depth hydrophone further includes a small port 158 passing through the end cap 130 which acts as a low pass filter to equalize the hydrostatic pressure appearing across the resilient sleeve 112 due to the effects of depth and other slowly changing pressure variations. As with the capillary tube 128 of FIG. 12 and the port 58 of FIG. 3, the length and diameter of the port 158 are important parameters for proper equalization of the hydrophone. The equations for calculating these parameters are the same as those given above with respect to the point hydrophone shown in FIG. 3.

Figure 14:
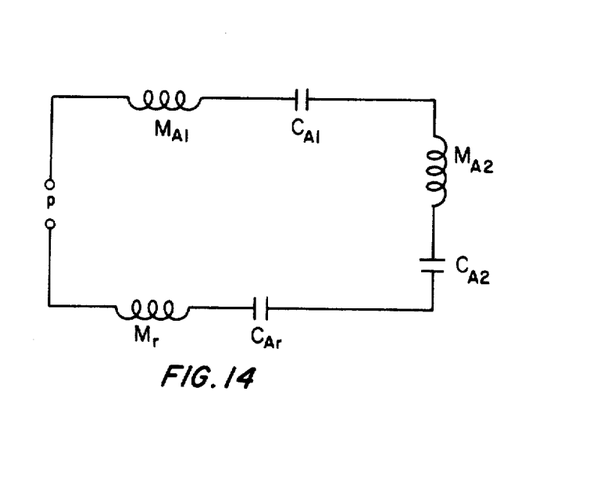
FIG. 14 illustrates an equivalant circuit of the extended hydrophone shown in FIG. 10.

In order to predict the sensitivity and the minimum detectable pressure of the extended hydrophone, the mechanical compliance $C_M$ must be determined in terms of the mechanical compliance of the fiber. This can be done from the equivalent circuit of the hydrophone for one microbend interval which is illustrated in FIG. 14. In this figure, P is the applied pressure, $C_{A1}$ and $C_{A2}$ are the acoustical compliances of the exposed and unexposed portions of the fiber 118 respectively, $C_{Ar}$ is the acoustic compliance of the resilient sleeve 110 $M_{A1}$ and $M_{A2}$ are the acoustical masses of the exposed and unexposed portions of the fiber 118 respectively, and $M_r$ is the effective acoustic mass of the resilient sleeve 110 plus a factor for the radiation reactance mass.

For the present hydrophone the compliance of the resilient sleeve $C_{Ar}$ is much larger than that of the bent fiber and thus may be ignored. Assuming that the fiber deflection in the exposed and unexposed portions of the fiber are equal, we have $C_{A1} = C_{A2}$. Thus the effective acoustic compliance $C'_A$ of the sensor per periodic interval can be expressed as:

$$1/C_A' = 1/C_{A1} + 1/C_{A2} \qquad (17)$$
$$= 2/C_{A1} = 2/C_{A2}$$

Treating the fiber 118 as a freely supporting bar, for uniform loading the mechanical compliance $C'_f$ over one interval is given by:

$$C'_f = C_{A1}/A'^2 = 5(\Lambda/2)^3/6\pi E d^4 \qquad (18)$$

where A' is the area per periodic interval, $\Lambda$ is the microbend interval, E is the YOUNG's modulus of the fiber, and d is the outside diameter of the fiber. The total acoustic compliance $C_A$ of the hydrophone with n periodic intervals is:

$$C_A = C'_A/n \qquad (19)$$

The total area A is A'n. Thus, the product $AC_M$ is independent of the number of periodic intervals:

$$AC_M = A'C'_M \cong A'C'_f \qquad (20)$$

The remaining sensitiving and minimum detectable pressure equations are the same as those discussed above with respect to the point hydrophone 10 shown in FIG. 3.

The resonance of the hydrophone $\omega_o$ is determined as follows:

$$\omega_o = 1/M_A C'_A \qquad (21)$$

where $M_A = M_{A1} + M_{A2} + M_r$ as seen in FIG. 14. The theoretical frequency response of the hydrophone is flat from a low frequency to about one octave below the hydrophone resonant frequency $\omega$.

The optical fiber 118 and the test set-up used to test the extended hydrophone 100 are the same as those discussed above with respect to the point hydrophone 10.

A test model of the extended hydrophone according to the present Invention had the following specifications. These specifications, of course, should not be considered as limiting the present Invention.

Length of Fiber = 6.24 m
Outside Diameter of Housing = 3.6 cm
Inside Diamter of Housing = 2.7 cm
Housing Material = Aluminum
Length of grooved area of housing = 4 cm
Number of Turns = 54
Microbend Interval = 5.5 mm
Number of Axial Slots = 21

The test model was tested in air; therefore, no pressure equalization means were included.

The measured frequency response of the extended hydrophone sensitivity from 200 Hz to 1500 Hz (Diamonds) is illustrated in FIG. 8. As can be seen from this Figure, the sensitivity is approximately −215 db re 1V/μPa and is flat to within ±1 db.

The measured minimum detectable pressure of the extended hydrophone from 200 Hz to 1500 Hz (Diamonds) is illustrated in FIG. 9. As can be seen from this Figure, for frequencies higher than 500 Hz, the minimum detectable pressure of 70 db re 1 μPa is only about 25 db higher than Sea State zero. The resonance of the extended hydrophone is expected to be about 30 KHz which is much higher than that of prior art microbend hydrophones.

In each of the hydrophones described above according to the present Invention, the detection of core modes has been utilized. However, "dark field" detection wherein the light power in the clad modes is detected may also be utilized. In this case the background light can be stripped from the clad modes just prior to the hydrophone. Thus, any fiber microbending induced core to clad coupling will cause a significant increase in the light power in the clad modes.

Except for the laser light source and the detector which can be located far from the sensing area, the microbending hydrophones according to the present Invention are all-optic sensor devices which do not utilize any electric power. The advantages of the fiber optic sensors over prior art piezoelectric or magnestrictive sensors are: they are not sensitive to electromagnetic interference, they provide higher transmission security, they have lower weight, and they are less expensive.

Since the present hydrophones are intensity modulated sensors using a single fiber, they are less sensitive to environmental conditions (especially temperature) than are phase modulated interferometric sensors. Since the single fiber is not terminated within the hydrophone, these sensors are simpler and more stable than terminated fiber-type sensors.

The design of the point hydrophone according to the present Invention has optimized the optic, acoustic, and mechanical properties of the sensor in order to enhance the sensor sensitivity and to broaden the frequency independent operating range. The two piston design reduces the acceleration sensitivity of the sensor, while the low frequency filter port provides depth compensation without adversely influencing the sensor performance in the frequency independent operating range.

The extended hydrophone according to the present invention is mechanically simple, free of acceleration effects, and utilizes a long optical fiber as the sensing element thus providing some shape flexibility and an enhanced signal to noise ratio. As with the point hydrophone, the capillary tube or the port provides depth compensation without adversely influencing the sensor performance.

Obviously, numerous (additional) modifications and variations of the present Invention are possible in light of the above teachings. It is therefore to be understood that within the scope of the appended claims, the Invention may be practiced otherwise than as specifically described herein.

What is claimed and desired to be secured by Letters Patent of the United States:

1. An acoustic pressure sensor, comprising:
   an optical fiber, said fiber conducting optical energy;
   first moveable microbending deformer means positioned in contact with said optical fiber for deforming said fiber in response to an acoustic pressure wave;
   second moveable microbending deformer means of equal mass to the first microbending deformer means positioned in contact with said optical fiber at a location diametrically opposed to said first deformer means for deforming said fiber in response to said acoustic pressure wave to eliminate the acceleration effects within the deformer means;
   first acoustic coupling means for coupling said acoustic pressure wave to said first deformer means; and
   second acoustic coupling means for coupling said acoustic pressure wave to said second deformer means;
   whereby said acoustic sensor intensity modulates said optical energy conducted by said fiber in response to said acoustic pressure wave.

2. The acoustic pressure sensor as recited in claim 1 which further comprises:
   an acoustically stiff housing, said housing enclosing at least a portion of said optical fiber, said housing enclosing said first and second microbending deformer means, said housing enclosing at least a portion of each of said first and second acoustic coupling means.

3. An acoustic pressure sensor; comprising:
   an acoustically stiff housing;
   an optical fiber, said optical fiber being at least partially enclosed by said housing, said optical fiber conducting optical energy;
   first moveable microbending deformer means positioned within said housing and positioned in contact with said optical fiber for deforming said fiber in response to an acoustic pressure wave;
   second moveable microbending deformer means of equal mass to the first microbending deformer means positioned within said housing and positioned in contact with said optical fiber at a location diametrically opposed to said first deformer means for deforming said fiber in response to said acoustic pressure wave to eliminate the acceleration effects within the deformer means;
   first acoustic coupling means for coupling said acoustic pressure wave to said first deformer means, said first coupling means being at least partially enclosed by said housing; and
   second acoustic coupling means for coupling said acoustic pressure wave to said second deformer means, said second coupling means being at least partially enclosed by said housing;
   whereby said acoustic sensor intensity modulates said optical energy conducted by said fiber in response to said acoustic pressure wave.

4. The acoustic pressure sensor as recited by claim 2 or claim 3, wherein said housing comprises:
   a cylindrical envelope made of acoustically stiff material: and
   first and second end caps rigidly and liquid-tightly sealed to respective first and second ends of said envelope, said end caps being made of acoustically stiff material.

5. The acoustic pressure sensor as recited by claim 2 or claim 3, wherein:
   said housing is filled with a liquid.

6. The acoustic pressure sensor as recited by claims 1, 2, or 3, wherein:
   said first deformer means includes a first corregated surface in contact with said fiber, said first corregated surface including a first plurality of parallel corregations, said first corregations being oriented perpendicular to the axis of said fiber; and
   said second deformer means includes a second corregated surface in contact with said fiber, said second corregated surface including a second plurality of parallel corregations, said second corregations being oriented perpendicular to the axis of said fiber;
   whereby said first and second corregated surfaces act to mechanically deform said fiber in response to said acoustic pressure wave.

7. The acoustic pressure sensor as recited by claim 6, wherein:
   said first plurality of corregations are evenly spaced apart from each other; and
   said second plurality of corregations are evenly spaced apart from each other.

8. The acoustic pressure sensor as recited by claim 6, wherein:
   said first plurality of corregations are unevenly spaced apart from each other: and
   said second plurality of corregations are unevenly spaced apart from each other.

9. The acoustic pressure sensor as recited by claims 1, 2, or 3, wherein said first deformer means includes:
   a first deformer assembly mechanically coupled to said first couplin means, said first deformer assembly including a first surface positioned adjacent to said fiber; and
   a first plurality of parallel wires located in parallel with said first surface of said first deformer assembly and rigidly affixed thereto, said first plurality of wires being positioned in contact with said fiber, said first plurality of wires being oriented perpendicular to the axis of said fiber;
   and wherein said second deformer means includes:
   a second deformer assembly mechanically coupled to said second coupling means and positioned in an opposed relationship to said first deformer assembly, said second deformer assembly including a second surface positioned adjacent to said fiber, said fiber passing between said first and second surfaces; and a second plurality of parallel wires located in parallel with said second surface of said second deformer assembly and rigidly affixed thereto, said second plurality of wires being positioned in contact with said fiber, said second plurality of wires being oriented perpendicular to the axis of said fiber;

whereby said first and second pluralities of wires act to mechanically deform said fiber in response to said acoustic pressure wave.

10. The acoustic pressure sensor as recited by claim 9, wherein:

at least a portion of each of said first and second deformer assemblies are permanently magnetized such that said first surface is magnetically attracted to said second surface;

whereby said first and second pluralities of wires are biased toward said fiber and maintained in contact therewith due to said magnetic attraction.

11. The acoustic pressure sensor as recited by claim 9, wherein:

said first plurality of wires are evenly spaced apart from each other; and said second plurality of wires are evenly spaced apart from each other.

12. The acoustic pressure sensor as recited by claim 9, wherein:

said first plurality of wires are unevenly spaced apart from each other; and said second plurality of wires are unevenly apart spaced from each other.

13. The acoustic pressure sensor as recited by claim 1, wherein:

said first acoustic coupling means includes a first piston, said first piston being rigidly attached to said first deformer means, said first piston including a first surface exposed to said acoustic pressure wave; and said second acoustic coupling means includes a second piston, said second piston being rigidly attached to said second deformer means, said second piston including a second surface exposed to said acoustic pressure wave.

14. The acoustic pressure sensor as recited by claim 2 or claim 3, wherein:

said first acoustic coupling means includes a first piston, said first piston being rigidly attached to said first deformer means, said first piston including a first surface exposed to said acoustic pressure wave, said first piston being slidably received in a first opening in said housing and liquid-tightly sealed thereto; and said second acoustic coupling means includes a second piston said second piston being rigidly attached to said second deformer means, said second piston including a second surface exposed to said acoustic pressure wave, said second piston being slidably received in a second opening in said housing and liquid-tightly sealed thereto.

15. The acoustic pressure sensor as recited by claim 14 which further comprises:

a resilient sleeve, said sleeve covering at least a portion of said housing and covering said first surface of said first piston and said second surface of said second piston, said acoustic pressure wave being transmitted to said first and second surfaces by said sleeve.

16. The acoustic pressure sensor as recited by claim 2 or claim 3, which further comprises:

low-pass filter pressure equalization means for equalizing static and slowly changing pressure variations between the inside and the outside of said housing.

17. The acoustic pressure sensor as recited by claim 16, wherein said low-pass filter pressure equalization means includes:

a passage coupling the inside of said housing to locations exterior of said housing, the diameter and length of said opening determining the frequency response characteristics of said sensor.

18. A deformer device for use in a microbending fiber optic sensor wherein said deformer device mechanically couples variations in a parameter to be sensed to an optical fiber such that optical energy passing through said fiber is intensity modulated in response to said variations in said parameter, said deformer device comprising:

a first moveable deformer assembly mechanically coupled to move in response to said sensed parameter, said assembly including a first surface positioned adjacent to said fiber;

a second moveable deformer assembly of equal mass to the first microbending deformer assembly mechanically coupled to move in response to said sensed parameter and positioned in an opposed relationship to said first deformer assembly to eliminate the acceleration effects within the deformer means, said second deformer assembly including a second surface positioned adjacent to said fiber, said fiber passing between said first and second surfaces;

a first plurality of parallel wires located in parallel with said first surface of said first deformer assembly and rigidly affixed thereto, said first plurality of wires being positioned in contact with said fiber, said first plurality of wires being oriented perpendicular to the axis of said fiber; and a second plurality of parallel wires located in parallel with said second surface of said second deformer assembly and rigidly affixed thereto, said second plurality of wires being positioned in contact with said fiber, said second plurality of wires being oriented perpendicular to the axis of said fiber;

wherein at least a portion of each of said first and second deformer assemblies are permanently magnetized so that said first surface is magnetically attracted to said second surface;

whereby said first and second pluralities of wires are biased toward said fiber and maintained in contact therewith due to said magnetic attraction.

19. The deformer device as recited by claim 18, wherein:

said first plurality of wires are evenly spaced apart from each other; and said second plurality of wires are evenly spaced apart from each other.

20. The deformer device as recited by claim 18, wherein:

said first plurality of wires are unevenly spaced from each other; and said second plurality of wires are unevenly spaced apart from each other.

21. An acoustic pressure sensor comprising:

an acoustically stiff hollow housing including an exterior cylindrical surface, said cylindrical surface, said cylindrical surface including a multiple turn helical grove formed in at least a portion thereof;

a plurality of parallel slots formed in said cylindrical surface, said slots being spaced apart from each other and positioned in parallel with the axis of said cylindrical surface, each of said slots intersecting said helical groove at a plurality of positions along said cylindrical surface, each of said slots having a depth greater than the depth of the root of said helical groove;

an optical fiber including a portion thereof continuously wrapped about said cylindrical surface and positioned within said helical groove, said fiber conducting optical energy; and means for applying transverse forces to said fiber for forcing said fiber into said plurality of parallel slots in response to an applied acoustical pressure wave thereby deforming said fiber in response to said pressure wave to eliminate the acceleration effects within the deformer means;

whereby said optical energy conducted by said fiber is intensity modulated in response to said acoustic pressure wave.

22. The acoustic pressure sensor as recited by claim 21 wherein said means for forcing said fiber into said slots includes:

a resiliant sleeve covering at least the portion of said fiber wrapped about said cylindrical surface and covering at least the portion of said cylindrical surface containing said cylindrical groove, said sleeve mechanically coupling said pressure wave to said fiber.

23. The acoustic pressure sensor as recited by claim 21, which further comprises:

low-pass filter pressure equalization means for equalizing static and slowly changing pressure variations between the inside and the outside of said resilient sleeve.

24. The acoustic pressure sensor as recited by claim 23, wherein said low-pass filter pressure equalization means includes:

a first acoustically stiff end cap rigidly and liquid-tightly sealed to a first end of said housing:

a resilient diaphragm liquid-tightly sealed to a second end to said housing, wherein said housing, said first end cap and said diaphragm defines an enclosed space within said housing; and a capillary tube passing through a portion of a sidewall of said housing, said capillary tube communicating between the enclosed space within said housing and a void area defined by the inner surface of said resilient sleeve and the portion of said cylindrical surface covered by said sleeve, the diameter and length of said capillary tube determining the frequency response characteristics of said sensor.

25. The acoustic pressure sensor as recited by claim 23, wherein said low-pass filter pressure equalization means includes:

first and second acoustically stiff end caps rigidly and liquid tightly sealed to respective first and second ends of said housing, said first and second end caps and said housing defining an enclosed space within said housing, said enclosed space being filled with liquid;

means for communicating pressure between said enclosed space and a void area defined by the inner surface of said resilient sleeve and the portions of said cylindrical surface covered by said sleeve: and a passage coupling said enclosed space within said housing with locations exterior of said sensor, the diameter and length of said passage defining the frequency response characteristics of said sensor.

* * * * *